April 7, 1925.  1,532,596
M. MADSEN
HOSE CLAMP
Filed July 18, 1923
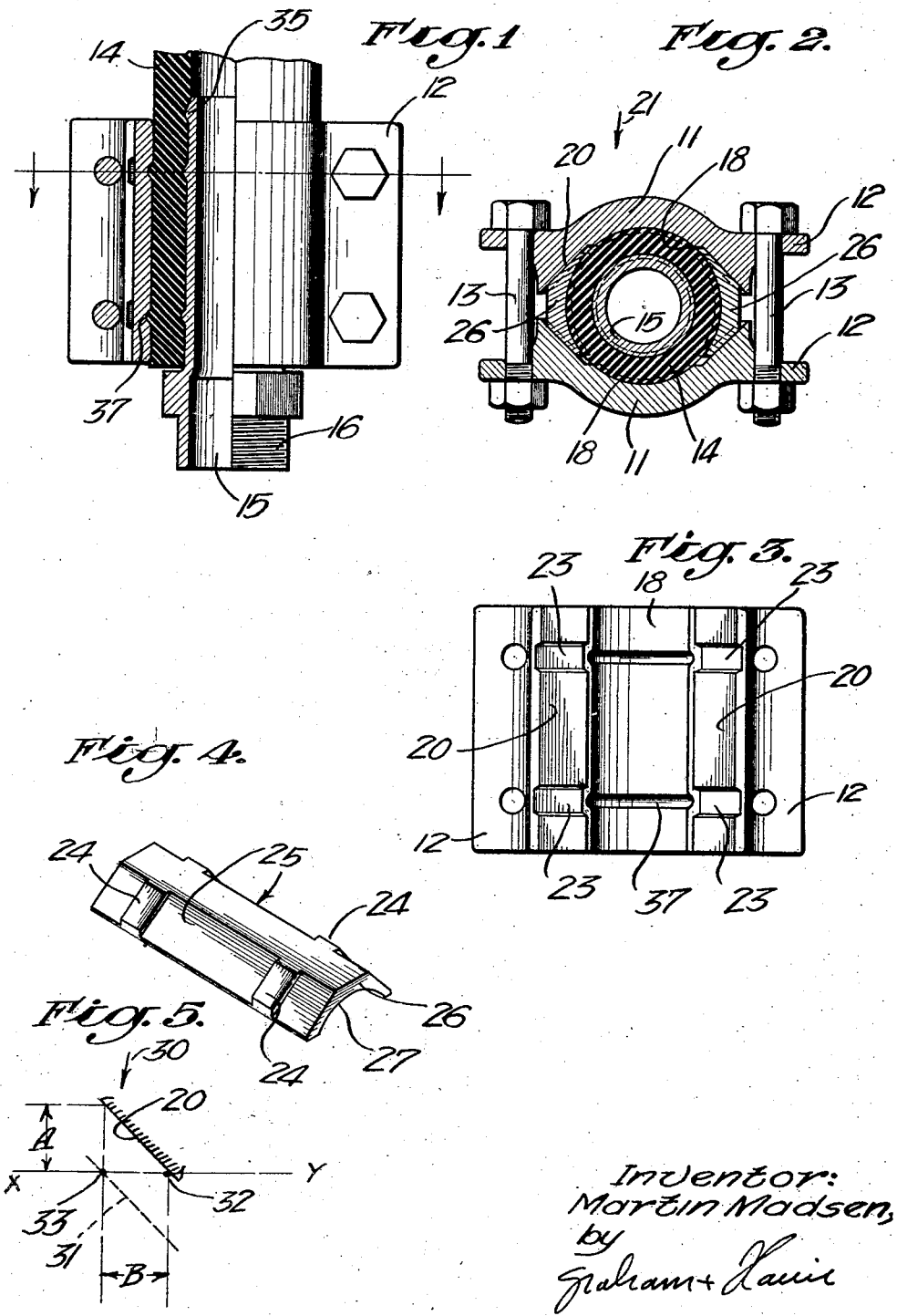
Inventor:
Martin Madsen,
by
Graham + Lewis
Attorneys.

Patented Apr. 7, 1925.

1,532,596

UNITED STATES PATENT OFFICE.

MARTIN MADSEN, OF MONTEREY PARK, CALIFORNIA, ASSIGNOR OF ONE-HALF TO PETER MADSEN, OF LOS ANGELES, CALIFORNIA.

HOSE CLAMP.

Application filed July 18, 1923. Serial No. 652,298.

*To all whom it may concern:*

Be it known that I, MARTIN MADSEN, a citizen of the United States, residing at Monterey Park, in the county of Los Angeles, State of California, have invented a new and useful Hose Clamp, of which the following is a specification.

This invention relates to hose clamps which are suitable for employment with flexible fabric and fabric composition hose in which high pressures are maintained.

A very wide use of the invention is in the oil fields where water and mud is pumped under high pressure into the well being drilled, for the purpose of providing circulation for mudding up the walls of the well. The pressures attained are very high especially in the drilling of a deep well, at times being above 1500 pounds per square inch. Considerable difficulty is experienced in holding the ends of the high pressure hose in the hose clamps which are employed for connecting between the stand pipe of the mud pump and the swivel of the drill stem through which the mud is induced into the string of drill pipe. The common type of clamp consists of a pair of cooperating members, having cooperating semi-circular channels therein, which set over and are intended to clamp the hose tightly upon the coupling nipple. The natural result of this construction is the compression of the hose at two opposite points, whereas the intermediate points between these diametral points of compression do not receive sufficient clamping pressure to hold them securely in place.

It is an object of the invention to provide a hose clamp which will clamp the hose with substantially equal pressure from all directions, thus accomplishing an efficient joinder between the hose and the coupling.

It is a further object of the invention to provide a clamp of this character which may be economically manufactured and which may be very easily applied upon the hose desired to be clamped upon a coupling nipple.

The especial advantages of the invention and further objects thereof will be made evident hereinafter.

Referring to the drawing which is for illustrative purposes only:

Fig. 1 is a plan view partly in section, illustrating the utility of the invention.

Fig. 2 is a section taken on a plane represented by the line 2—2 of Fig. 1.

Fig. 3 is an inside face view of one of the coupling plate members.

Fig. 4 is a perspective view of one of the clamp members employed in the invention.

Fig. 5 is a diagram illustrating the relational movement between the clamp plates and the wedge members.

In the form of my invention shown in the drawing, a pair of cooperating clamp plates 11 are provided, having radially extending flanges 12 through which bolts 13 may be extended to clamp the plates together upon a hose 14 in which a coupling nipple 15 having threads 16 at the outer end thereof, has been inserted. Centrally in the inner face of each clamp plate 11 is formed an arcuated longitudinal depression 18 generated on a radius substantially the same as the radius of the hose to which the clamp is to be applied. The extension of the arc of the depression 18 is slightly less than a quarter circle, and when the plates 11 are placed together, the depressions 18 operate diametrically with respect to each other in compressing the hose 14 against the nipple 15.

Adjacent to the arcuated depressions 18, and upon either side thereof, are formed plane faces 20 which extend the length of the plates 11 and are disposed at an angle of 45 degrees relative to the direction indicated by the arrow 21 in which the plates move and in which direction the pressure of the plates 11 is applied. Near the end of each diagonal face 20 a lateral key way 23 is formed into which keys 24 formed upon the angular faces 25 of the wedge members 26 are received. The wedge members 26 are provided with arcuated interior faces 27 which are also slightly less than quarter circular extension. The faces 25 of the wedges 26 are disposed perpendicularly to each other and rest against the faces 20 of the clamp plates 11.

The action obtained by this construction results in an inward radial movement of the wedges when the plates 11 are drawn together, and the faces 20 and 25 are so disposed relative to the line of movement of the plates 11 that the inward movement of the wedges is substantially the same as the inward movement of the plates 11. The diagram, Fig. 5, is explanatory of this action.

Let it be considered that the face 20 is moved downwardly in the direction of the arrow 30 to the position indicated by the dotted line 31; or in other words that the face 20 is moved downwardly through the distance A. 32 represents any point in the face of the wedge member cooperating with the face 20; this point is movable only in a direction perpendicular to the direction indicated by the arrow 30; that is to say, the point 32 is movable along the line X—Y. The engagement of the face 20 with the point 32 forces the point in a leftward direction so that when the face 20 has reached the position indicated by the dotted line 31, the point 32 is in the position indicated at 33, which position is at a distance B from the original position of the point 32. When the faces are disposed at an angle of 45 degrees, the distances A and B will be equal, as will become evident in the comparison of these distances in Fig. 5.

It is customary to provide ridges 35 on the nipples 15 and, therefore, corresponding circular channels 37 are formed in the arcuated faces 18 and 27 of the plates 11 and the wedges 26, into which grooves 37 the hose is depressed as shown in Fig. 1.

The clamp shown in the drawing and hereinbefore described provides a compression of the hose against the nipple from four directions and accomplishes this compression without shearing the surface structure of the hose as sometimes occurs when a pair of semi-circular clamps are employed. The effect attained by the use of my invention is the substantial equal compression of the hose throughout its entire circumference, without destruction of the hose structure due to pinching.

I claim as my invention:

1. In a hose clamp, the combination of: a pair of oppositely disposed primary members having aligning slots; means for drawing said primary members together; and oppositely disposed secondary members disposed on a plane substantially perpendicular to the direction of movement of said primary members, and arranged to be forced inwardly by said primary members, and keys formed on said secondary members adapted to cooperate with said slots on said primary members for aligning said primary and secondary members.

2. In a hose clamp, the combination of: a pair of clamp plates oppositely disposed and each having an inwardly disposed arcuated depression and diagonal faces; there being slots in said diagonal faces; means for drawing said clamp plates together; and cooperative with said clamp plates, a pair of oppositely disposed members having diagonal faces engaged by said diagonal faces of said clamp plates in a manner to force said members inwardly when said clamp plates are drawn together, and keys formed on the diagonal faces of said cooperative members, said keys being arranged to engage with said slots for aligning said plates and said cooperative members.

3. In a hose clamp, the combination of: a pair of oppositely disposed primary members having aligning slots; means for drawing said primary members together; and oppositely disposed secondary members disposed on a plane substantially perpendicular to the direction of movement of said primary members, and arranged to be forced inwardly by said primary members, and keys formed on said secondary members arranged to cooperate with said slots in said primary members for aligning said primary and secondary members.

4. In a hose clamp, the combination of: a pair of oppositely disposed primary members; means for drawing said primary members together; and oppositely disposed secondary members disposed on a plane substantially perpendicular to the direction of movement of said primary members, and arranged to be forced inwardly by said primary members, there being interlocking engagement between said diagonal faces of said clamp plates and said cooperative members for holding them in alignment.

In testimony whereof, I have hereunto set my hand at Los Angeles, California, this 7th day of July, 1923.

MARTIN MADSEN.